United States Patent
Kotegawa et al.

(10) Patent No.: US 12,126,231 B2
(45) Date of Patent: Oct. 22, 2024

(54) FIXING RING, ROTARY ELECTRIC MACHINE, AND RESOLVER ROTOR

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Hajime Kotegawa, Kawasaki Kanagawa (JP); Hideki Hisada, Kuwana Mie (JP)

(73) Assignees: Kabushiki Kaisha Toshiba, Tokyo (JP); Toshiba Infrastructure Systems & Solutions Corporation, Kawasaki Kanagawa (JP)

(*) Notice: Subject to any disclaimer, the term of this patent is extended or adjusted under 35 U.S.C. 154(b) by 202 days.

(21) Appl. No.: 18/066,894

(22) Filed: Dec. 15, 2022

(65) Prior Publication Data

US 2023/0119104 A1     Apr. 20, 2023

Related U.S. Application Data

(63) Continuation of application No. PCT/JP2022/017052, filed on Apr. 4, 2022.

(30) Foreign Application Priority Data

Sep. 15, 2021   (JP) ................... 2021-150263

(51) Int. Cl.
   *H02K 24/00*       (2006.01)
   *H02K 11/225*      (2016.01)

(52) U.S. Cl.
   CPC ........... *H02K 24/00* (2013.01); *H02K 11/225* (2016.01)

(58) Field of Classification Search
   CPC .................. H02K 11/225; H02K 24/00
   (Continued)

(56) References Cited

U.S. PATENT DOCUMENTS 9,841,104 B2 * 12/2017 Uehara ............... F16J 15/3292
2006/0030441 A1 * 2/2006 Watanabe ........... F16F 15/3153
                                                            474/166

(Continued)

FOREIGN PATENT DOCUMENTS

JP   2007-64870 A   3/2007
JP   2010-25900 A   2/2010
(Continued)

OTHER PUBLICATIONS

Japan Patent Office, International Search in International Application No. PCT/JP2022/017052 (Jun. 21, 2022), 2 pages, and machine translation, 3 pages.

*Primary Examiner* — Rashad H Johnson
(74) *Attorney, Agent, or Firm* — Finnegan, Henderson, Farabow, Garrett & Dunner, LLP

(57) ABSTRACT

According to one embodiment, each of the first piece portions of a fixing ring is elastically deformed with a first bent portion to be bent toward a first surface side serving as a point of origin. In a map shape formed by projecting a plurality of broad portions and the first piece portions onto a virtual plane parallel to the first surface, each of the first bent portion intersects a straight line passing through a contact point of a circumscribed circle in contact with an outer circumferential edge of the broad portion on which the first piece portion is provided and a center point of the circumscribed circle. Each of the first piece portions is positioned between an inscribed circle in contact with an inner circumferential edge of the first piece portion and the first bent portion.

8 Claims, 7 Drawing Sheets

(58) Field of Classification Search
USPC .......................................................... 310/68 B
See application file for complete search history.

(56) References Cited

U.S. PATENT DOCUMENTS

| | | | | |
|---|---|---|---|---|
| 2011/0057648 | A1* | 3/2011 | Goto | G01D 5/145 |
| | | | | 324/207.25 |
| 2014/0345999 | A1* | 11/2014 | Kitayama | F16D 27/108 |
| | | | | 192/44 |
| 2016/0348740 | A1* | 12/2016 | Kitayama | F16D 27/108 |
| 2018/0069450 | A1* | 3/2018 | Takeuchi | H02K 7/003 |
| 2019/0028015 | A1* | 1/2019 | Powell | H02K 49/102 |

FOREIGN PATENT DOCUMENTS

| | | |
|---|---|---|
| JP | 4628904 B2 | 2/2011 |
| JP | 2012-93101 A | 5/2012 |
| JP | 2013-27123 A | 2/2013 |
| KR | 10-2014-0003677 | 11/2018 |

\* cited by examiner

FIXING RING, ROTARY ELECTRIC MACHINE, AND RESOLVER ROTOR

CROSS-REFERENCE TO RELATED APPLICATIONS

This application is a Continuation application of PCT Application No. PCT/JP2022/017052 filed Apr. 4, 2022 and based upon and claiming the benefit of priority from Japanese Patent Application No. 2021-150263, filed Sep. 15, 2021, the entire contents of all of which are incorporated herein by reference.

FIELD

Embodiments described herein relate generally to a fixing ring, rotary electric machine, and resolver rotor.

BACKGROUND

In a rotary electric machine, in order to detect a rotational angle of the rotating shaft, a rotational angle sensor is widely used. A resolver which is one of rotational angle sensors is constituted of a resolver rotor fixed to, for example, a rotating shaft of a rotary electric machine and rotated in such a manner as to be integrated with the rotating shaft, and resolver stator to be arranged in opposition to the outer circumference of the resolver rotor. The aforementioned resolver measures a change in the opposition distance (gap) between the resolver rotor and resolver stator to thereby detect a rotational angle of the rotating shaft.

Regarding the resolver rotor, in order to enhance the detection accuracy of the rotational angle, it is necessary to suppress displacement of the resolver rotor itself relative to the rotating shaft to the utmost. For example, a method of fixing the resolver rotor in the circumferential direction by forming a key groove in the rotating shaft and providing the resolver rotor with a key-shaped portion has conventionally been employed. Further, for example, by clearance-fitting the resolver rotor onto the rotating shaft, and thereafter press-fitting a member such as a collar or the like onto the rotating shaft and pressing the resolver rotor in the axial direction, it is possible to suppress the displacement of the resolver rotor in the axial direction. In addition, by virtue of the frictional force to be created between the member such as the collar or the like and resolver rotor, it becomes possible to suppress displacement of the resolver rotor in both the circumferential direction and radial direction.

On the other hand, when the position of the resolver rotor is fixed by pressing the resolver rotor in the axial direction by means of a predetermined member press-fitted on the rotating shaft, it is required that the load (pressing force) to be exerted on the resolver rotor to suppress displacement of the resolver rotor relative to the rotating shaft be appropriately adjusted.

Thus, embodiments described herein aim to provide a fixing ring capable of suppressing displacement of a resolver rotor relative to a rotating shaft and appropriately adjusting the load (pressing force) to be applied to position and fix the resolver rotor, rotary electric machine including a resolver rotor fixed by the fixing ring, and resolver rotor enabling the aforementioned displacement suppression and load (pressing force) adjustment.

DETAILED DESCRIPTION

Figure 1:
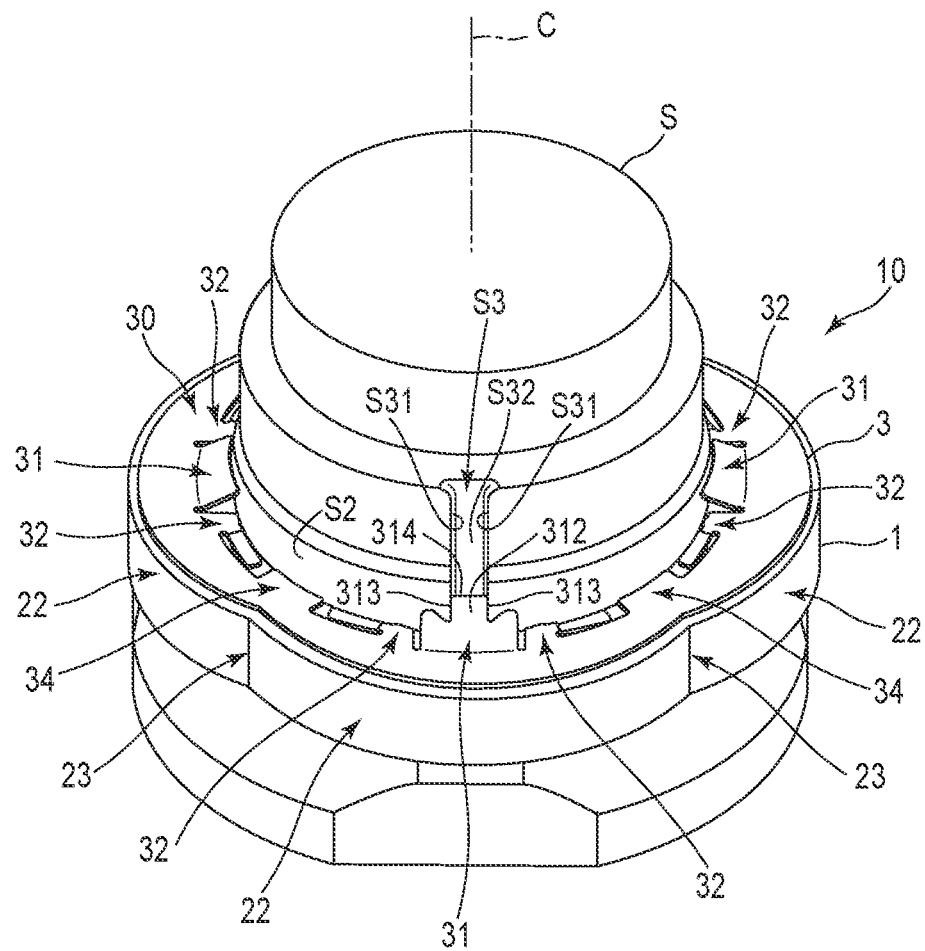
FIG. 1 is a perspective view schematically showing a rotor of a rotary electric machine including a fixing ring of an embodiment.

In general, according to one embodiment, a fixing ring includes a plurality of narrow portions, a plurality of broad portions, a plurality of first piece portions, and a plurality of second piece portions.

Each of the plurality of narrow portions is provided on an annular first surface and a second surface opposed to each other in parallel with each other, and widths of which viewed from an outer circumferential surface connecting between an outer circumferential edge of the first surface and an outer circumferential edge of the second surface in an inward normal direction of the outer circumferential surface are the smallest.

Each of the plurality of broad portions is provided on the first surface and the second surface, and widths of which are greater than the widths of the narrow portions.

Each of the plurality of first piece portions is provided on each of the broad portions, and is elastically deformable in the normal direction of the broad portion with a first bent portion to be bent toward the first surface side serving as a point of origin.

Each of the plurality of second piece portions is arranged adjacent to the first piece portion of each of the broad portions in a circumferential direction of the first surface and the second surface and is elastically deformable in a direction of a distance between the first surface and the second surface with a second bent portion to be bent toward the second surface side serving as a point of origin.

In a map shape formed by projecting the plurality of broad portions and the plurality of first piece portions onto a virtual plane parallel to the first surface, the first bent portion of each of the first piece portions intersects a straight line passing through a contact point of a circumscribed circle in contact with an outer circumferential edge of the broad portion on which the first piece portion is provided and a center point of the circumscribed circle. Each of the first piece portions is positioned between an inscribed circle in contact with an inner circumferential edge of the first piece portion and the first bent portion.

In a map shape formed by projecting the plurality of first piece portions and the plurality of second piece portions onto the virtual plane, each of the second piece portions is positioned outside the inscribed circle in contact with the inner circumferential edge of the first piece portion adjacent to the second piece portion.

Hereinafter, a fixing ring, rotary electric machine, and resolver rotor according to an embodiment will be described below with reference to FIGS. 1 to 7. The fixing ring is one of constituent elements of a rotary electric machine and is a member configured to fix a resolver rotor to a rotating shaft of the rotary electric machine. As the rotary electric machine, although various motors, generators, and the like can be applied, in this embodiment, an inner-rotor generator is applied as an example. A resolver rotor is a constituent element of a resolver configured to detect a rotational state of a rotating body. The resolver is a rotational angle sensor configured to detect a rotational angle as the rotational state of the rotating body, and includes, as main constituent elements, a resolver rotor and resolver stator. In this embodiment, the resolver rotor is a member fixed to a rotating shaft of the rotary electric machine and rotated integral with the rotating shaft. The resolver stator is a member arranged in opposition to an outer circumference of the resolver rotor and staying unmoved relatively to the resolver rotor. Thereby, the resolver measures a change in the opposition interval (gap) between the resolver rotor and resolver stator to thereby detect a rotational angle of the rotating shaft.

Figure 2:
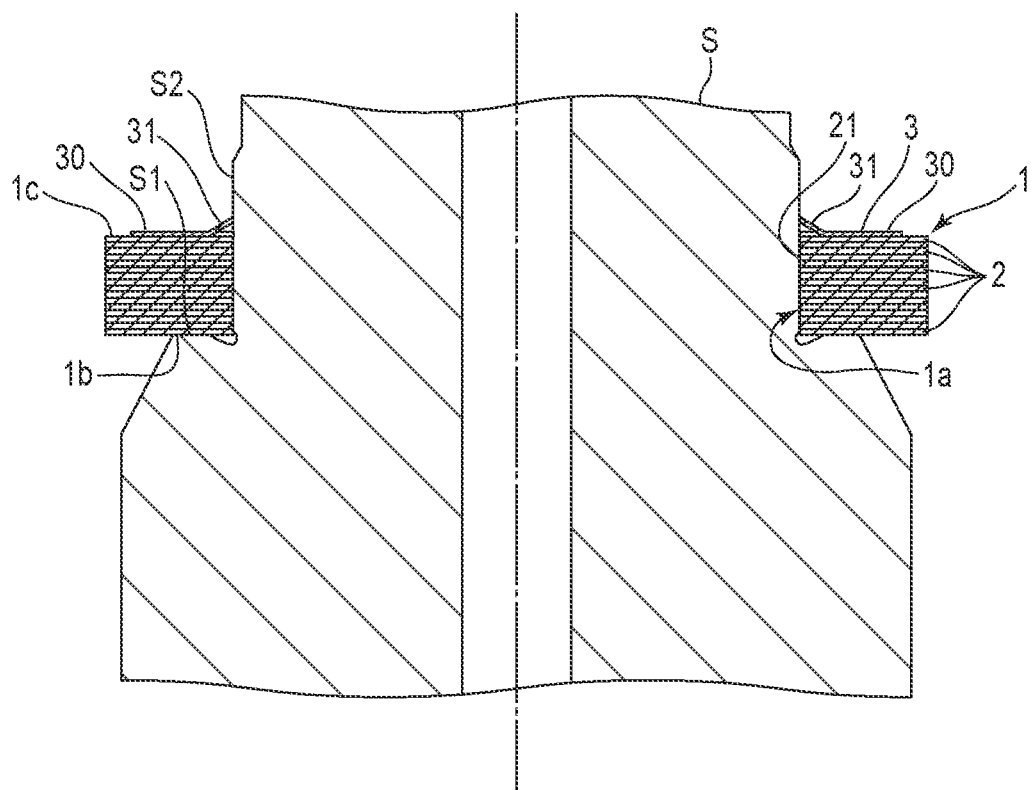
FIG. 2 is a cross-sectional view schematically showing the rotor of the rotary electric machine including the fixing ring of the embodiment.

In FIG. 1 and FIG. 2, a rotor 10 of the rotary electric machine according to this embodiment is schematically shown. FIG. 1 is a perspective view schematically showing the rotor 10. FIG. 2 is a cross-sectional view schematically showing the rotor 10.

As shown in FIG. 1 and FIG. 2, the rotary electric machine is configured to include the cylindrical stator (illustration omitted) and approximately cylindrical rotor 10 arranged inside the stator. The rotor 10 is positioned concentric with a shaft center C of the rotating shaft S together with the stator and is rotated around the shaft center C together with the rotating shaft S. In the following descriptions, the direction along the shaft center C of the rotating shaft S in the rotary electric machine is made the axial direction and direction around the shaft center C is made the circumferential direction. The circumferential direction corresponds to the rotational direction of the rotating shaft S. Further, the direction intersecting the axial direction and circumferential direction at right angles is made the radial direction and, in the radial direction, the closer side to the shaft center C is made the inside and the farther side away from the shaft center C is made the outside.

The resolver rotor 1 is constituted by stacking a plurality of plate-like members (hereinafter referred to as resolver rotor constituent members) 2 on top of each other in layers. The resolver rotor constituent members 2 are configured by forming steel plates into annular shapes having the same shame and same dimension and have circular openings 21 at their central portions. The resolver rotor constituent members 2 are stacked on top of each other in layers in such a manner that the openings 21 are made to concentrically communicate with each other. The resolver rotor constituent members 2 are stacked on top of each other in layers with the openings 21 made to concentrically communicate with each other in the manner described above, whereby a through-hole 1a is formed at the central part of the resolver rotor 1. The inner diametric dimension (inner diameter) of the opening 21 is made a dimension capable of clearance fitting (loose fitting) onto the outer circumferential portion of the rotating shaft S. Thereby, the resolver rotor 1 is clearance-fitted onto the outer circumference of the rotating shaft S at the through-hole 1a thereof and is made attachable to the rotating shaft S.

Further, the outline form (hereinafter referred to as an outer circumferential shape) of the outer circumferential edge of the resolver rotor constituent member 2 is made a non-circular shape making the gap between itself and resolver stator vary. For example, the resolver rotor constituent members 2 have an outer circumferential shape in which a plurality of broad portions 22 each having the same curvature greater than the curvature of the inner circumferential portion of the resolver stator opposed to the resolver rotor constituent members 2 are arranged in the circumferential direction. The broad portions 22 adjacent to each other in the circumferential direction are continuous with each other through a narrow portion 23. The narrow portion 23 is a portion at which the outer circumferential shape of the resolver rotor constituent members 2 is concavely depressed and diametric dimension of the outer circumferential shape formed between the broad portions 22 adjacent to each other is minimized. That is, the resolver rotor constituent members 2 each have a planar shape in which the broad portions 22 and narrow portions 23 are alternately continuous with each other and outer circumferential shapes of the broad portions 22 and narrow portions 23 are alternately continuous with each other at the outer circumferential edge. In this embodiment, as an example, four broad portions 22 and four narrow portions 23 are provided and are arranged in such a manner as to be point-symmetric relatively to the shaft center C. However, the numbers of the broad portions 22 and narrow portions 23 are not particularly limited. It should be noted that the resolver rotor constituent members 2 may include a key configured to engage with a key groove S3 of the rotating shaft S to be described later at a portion of the inner circumferential edge.

In the resolver, by rotating the resolver rotor 1 relatively to the resolver stator, it is possible to periodically vary the gap between the rotor 1 and stator. At this time, the rotational angle of the rotating shaft S to which the resolver rotor 1 is attached is detected on the basis of the change in the gap. For example, when a magnetic field is formed by making a current flow through a coil wound inside the resolver stator while the rotating shaft S is rotated, the resolver rotor 1 rotates in the magnetic field. Accordingly, by detecting the changing state of the magnetic flux at this time, it becomes possible to detect the rotational angle of the rotating shaft S. The resolver configured to include the resolver rotor 1 and resolver stator as described above outputs a rotational angle signal corresponding to the rotational angle of the resolver rotor rotating concomitantly with the rotation of the rotating shaft S to a control device (illustration omitted). Thereby, the control device carries out rotation control of the rotary electric machine on the basis of the output rotational angle signal.

The resolver rotor 1 is supported on a seating face portion S1 of the rotating shaft S in the axial direction in a state where the through-hole 1a thereof is clearance-fitted on the outer circumference of the rotating shaft S. As shown in FIG. 2, the seating face portion S1 is a step portion created by a diametric difference between the major-diameter portion and minor-diameter portion on the outer circumferential portion of the rotating shaft S and is an annular planar portion continuous in the circumferential direction. In the example shown in FIG. 2, the resolver rotor 1 is struck against the seating face portion S1 at an end face (underside in FIG. 2, hereinafter referred to as one end face) 1b thereof in the axial direction and is in surface contact with the seating face portion S1. In this case, the resolver rotor 1 is struck against the seating face portion S1 at the one end face 1b thereof in a state where the through-hole 1a thereof is press-fitted onto the rotating shaft S from above in the axial direction.

The resolver rotor 1 is supported relatively to the rotating shaft S by a fixing member 3 in the state where the one end face 1b thereof is in surface contact with the seating face portion S1 as described above.

Figure 3:
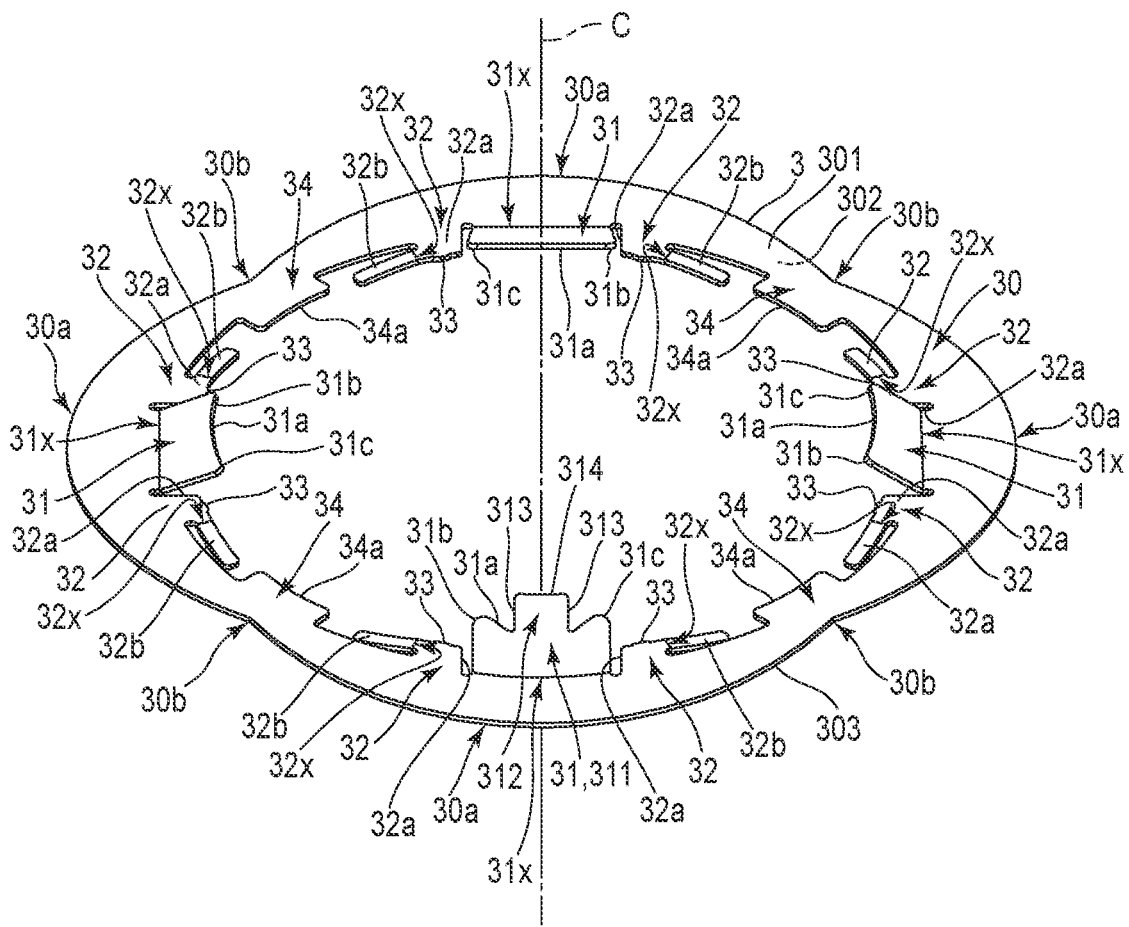
FIG. 3 is a perspective view schematically showing the fixing ring of the embodiment.

FIG. 3 is a perspective view schematically showing the fixing member 3. As shown in FIG. 2 and FIG. 3, the fixing member (hereinafter referred to as a fixing ring) 3 is an annular member which can be press-fitted onto the rotating shaft S and positions and fixes the resolver rotor 1 by interposing the resolver rotor 1 between itself and seating face portion S1. In order to suppress a change in the fixed state of the resolver rotor 1 due to a change in temperature, although it is sufficient if the fixing ring 3 is formed of, for example, a material having a coefficient of linear expansion equivalent to the rotating shaft S, the specific material is not particularly limited.

As shown in FIG. 3, the fixing ring 3 includes an annular flat-plate portion 30, and protrusion portions of two types of configurations provided on the flat-plate portion 30. The flat-plate portion 30 extends along an end face (hereinafter referred to as the other end face) 1c of the resolver rotor 1 in the axial direction. The other end face 1c is a face on the opposite side of the one end face 1b in the axial direction and, in the example shown in FIG. 2, is the top surface. The flat-plate portion 30 is in contact with the other end face 1c in the state where the fixing ring 3 is press-fitted on the rotating shaft S and resolver rotor 1 is thereby positioned and fixed. In the aforementioned state, the outline form (outer circumferential shape) of the outer circumferential edge of the flat-plate portion 30 is made a non-circular shape one size smaller than the outer circumferential shape of the resolver rotor 1. Thereby, the outer circumferential edge of the flat-plate portion 30 is prevented from sticking out of the outer circumferential edge of the resolver rotor 1, and adverse influence on the detection accuracy of the change of the magnetic flux to be detected by the resolver, i.e., the detection accuracy of the rotational angle of the rotating shaft S is suppressed.

The flat-plate portion 30 includes narrow portions 30b and broad portions 30a. The narrow portion 30b is a portion which is provided on each of a first surface 301 and second surface 302 of the flat-plate portion 30 opposed to each other in parallel with each other, and a width of which viewed from the outer circumferential surface 303 of the flat-plate portion 30 in the inward normal direction of the outer circumferential surface 303 is the smallest. The normal direction corresponds to the radial direction. The outer circumferential surface 303 of the flat-plate portion 30 is a surface portion connecting between the outer circumferential edge of the first surface 301 and outer circumferential edge of the second surface 302. The broad portion 30a is a portion provided on each of the first surface 301 and second surface 302 of the flat-plate portion 30 and having a width greater than the narrow portion 30b. The first surface 301 and second surface 302 are end faces at both ends in the axial direction and, second surface 302 is a surface in contact with the other end face 1c of the resolver rotor 1.

The broad portions 30a each have outer circumferential shapes curved in the circumferential direction by the same curvature greater than the curvature of the broad portion 22 of the resolver rotor constituent members 2. The broad portions 30a adjacent to each other in the circumferential direction are continuous with each other through the narrow portion 30b. The narrow portion 30b is a portion at which the outer circumferential shape of the flat-plate portion 30 is concavely depressed and diametric dimension of the outer circumferential shape formed by the broad portions 30a adjacent to each other is minimized. That is, the flat-plate portion 30 has a planar shape in which the broad portions 30a and narrow portions 30b are alternately continuous with each other. In this embodiment, as an example, the four broad portions 30a and four narrow portions 30b are provided so as to be the same in number as the resolver rotor constituent members 2 and are arranged point-symmetric relatively to the shaft center C. However, the numbers of the broad portions 30a and narrow portions 30b are not particularly limited and may not be coincident with the resolver rotor constituent members 2.

The flat-plate portion 30 includes, as two types of configurations of protruding portions, a plurality of first piece portions 31 and a plurality of second piece portions 32. Each of the first piece portion 31 and second piece portion 32 functions as a spring piece for the flat-plate portion 30. In the example shown in FIG. 3, on the flat-plate portion 30, the four first piece portions 31 and eight second piece portions 32 are provided. However, these numbers are not limited to the above.

The first piece portions 31 are provided to the broad portions 30a on a one-to-one basis and are each made elastically deformable with a first bent portion 31x at which the first piece portion 31 is bent toward the first surface 301 side of the flat-plate portion 30 used as a point of origin. Thereby, each of the first piece portions 31 is elastically deformed in the inward normal direction of the outer circumferential surface 303 from the outer circumferential surface 303 of the broad portion 30a, i.e., in short, inwardly in the radial direction with the first bent portion 31x used as the point of origin. That is, the first piece portion 31 functions as a spring piece.

Figure 4:
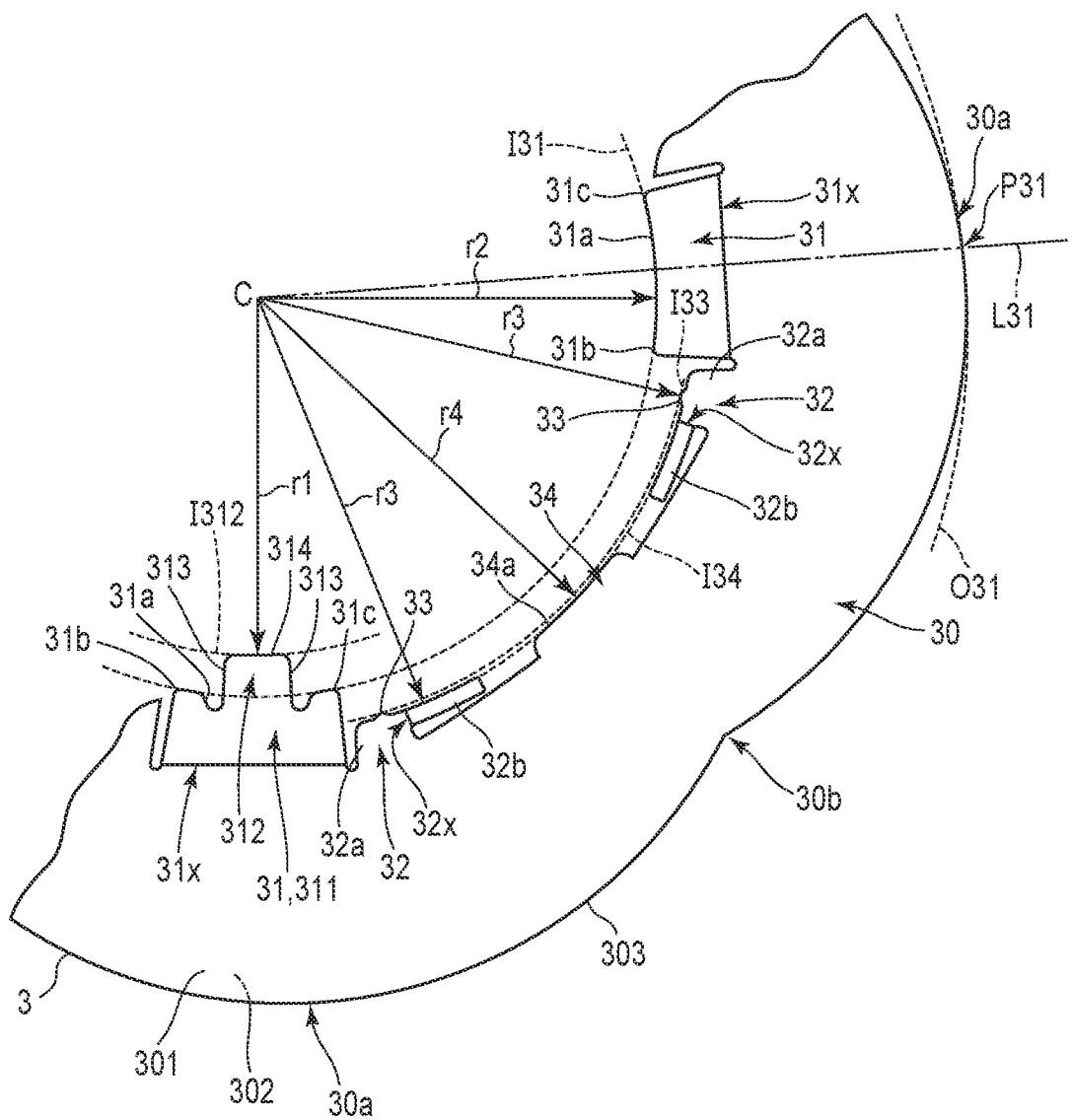
FIG. 4 is a view schematically showing the fixing ring of the embodiment by a map shape formed by projecting each portion of the fixing ring onto a virtual plane.

FIG. 4 is a view schematically showing the fixing ring 3 by a map shape formed by projecting each portion of the fixing ring 3 onto a virtual plane. In the predetermined map shape shown in FIG. 4, the first bent portion 31x of each of the first piece portions 31 intersects a straight line L31 passing through a contact point P31 of a circumscribed circle O31 in contact with the outer circumferential edge of the broad portion 30a on which the first piece portion 31 is provided and center point of the aforementioned circumscribed circle O31. The predetermined map shape is a shape of a map obtained by projecting the plurality of broad portions 30a, plurality of first piece portions 31, and plurality of second piece portions 32 onto a virtual plane parallel to the first surface 301 of the flat-plate portion 30. In the following descriptions, the predetermined map shape is referred to as a map shape on the virtual plane. The center point of the circumscribed circle O31 is a point of intersection of the shaft center C and virtual plane. Further, in the map shape, each of the first piece portions 31 is positioned between an inscribed circle 131 in contact with the inner circumferential edge of the first piece portion 31 and first bent portion 31x. The center point of the inscribed circle 131 is a point of intersection of the shaft center C and virtual plane.

The first piece portion 31 includes a contact portion 31a to be in contact with an outer circumferential surface S2 of the rotating shaft S. The contact portion 31a is a tip end portion (extension end portion) of the first piece portion 31 in the radial direction. When the fixing ring 3 is press-fitted onto the rotating shaft S, the first piece portion 31 is brought into contact with the outer circumferential surface S2 at the contact portion 31a, whereby the first piece portion 31 is pressed by the outer circumferential surface S2 and is elastically deformed relatively to the flat-plate portion 30 so as to be outwardly warped. Then, in the state where the fixing ring 3 positions and fixes the resolver rotor 1, in other words, in the state where the flat-plate portion 30 is in contact with the other end face 1c of the resolver rotor 1, the contact portion 31a presses the outer circumferential surface S2 by the restoring force of the elastic deformation of the first piece portion 31. Thereby, each of the first piece portions 31 supports the fixing ring 3 (in short, the flat-plate portion 30) in the radial direction and axial direction relatively to the rotating shaft S to thereby position and fix the fixing ring 3.

In the configuration of contact between the contact portion 31a and outer circumferential surface S2, the closer the configuration to point contact, the more convergently it becomes possible to exert the pressing force on the outer circumferential surface S2 by means of the contact portion 31a. Accordingly, in order to more strongly position the fixing ring 3 to the rotating shaft S, it is desirable that the contact portion 31a be in line contact or point contact with the outer circumferential surface S2 rather than surface contact. From such a point of view, in this embodiment, the contact portion 31a is made to have a configuration concavely curved by a curvature greater than the curvature of the outer circumferential surface S2. Thereby, the contact portion 31a comes into contact (approximately point contact) with the outer circumferential surface S2 at two points of both ends 31b and 31c thereof in the circumferential direction.

In the map shape on the virtual plane shown in FIG. 4, the first bent portion 31x of each of the first piece portions 31 intersects the straight line L31. That is, the first piece portion 31 is arranged on the broad portion 30a in such a manner as to overlap, when viewed in the radial direction on the virtual plane, the portion at which the width (difference between the outer diametric dimension and inner diametric dimension) of the flat-plate portion 30 is the maximum, i.e., the portion (swollen portion) of the broad portion 30a protruding to the outermost side thereof in the radial direction. Thereby, it is possible to secure the width of the flat-plate portion 30 at the portion serving as the point of origin when the first piece portion 31 is elastically deformed relatively to the flat-plate portion 30, i.e., at the first bent portion 31x to the utmost extent. As described above, the portion of the broad portion 30a overlapping the first piece portion 31 corresponds to a portion at which the cross-sectional area of the flat-plate portion 30 in the predetermined plane defined by the radial direction and axial direction is maximized. Accordingly, for example, even when the width (length in the radial direction) of the first piece portion 31 is increased, it is possible to secure the width of the flat-plate portion 30 to the utmost extent, and suppress lowering of the strength of the fixing ring 3.

As shown in FIG. 3, the fixing ring 3 (flat-plate portion 30) of this embodiment includes the four first piece portions 31. In the map shape on the virtual plane shown in FIG. 4, one (first piece portion 311) of the plurality of first piece portions 31 includes a protrusion (second protrusion) 312 inwardly protruding in the radial direction from the inscribed circle 131 in contact with the inner circumferential edges of the first piece portions 31 other than the first piece portion 311. The protrusion 312 is a key (hereinafter referred to as a key 312) configured to prevent the fixing ring 3 from being rotationally moved relatively to the rotating shaft S and position the fixing ring 3 in the circumferential direction, in other words, in the rotational direction of the rotating shaft S. For this reason, a key groove S3 correspondent to the key 312 is formed in the rotating shaft S. When being press-fitted onto the rotating shaft S, the fixing ring 3 is aligned in the circumferential direction in such a manner that the key 312 engages with the key groove S3.

As shown in FIG. 3, the key 312 is located approximately at the middle of the contact portion 31a of the first piece portion 311 in the circumferential direction, and inwardly protrudes in the radial direction from both ends 31b and 31c of the contact portion 31a, i.e., from the portions of contact with the outer circumferential surface S2 of the rotating shaft S by an amount corresponding to the depth of the key groove S3. In the map shape on the virtual plane shown in FIG. 4, the key 312 protrudes by a difference between the radius r2 of the inscribed circle 131 and radius r1 of an inscribed circle 1312 in contact with the inner circumferential edge of the key 312. The key 312 is required only to position the fixing ring 3 in the circumferential direction relatively to the rotating shaft S, and hence it is sufficient if both end portions 313 of the key 312 in the circumferential direction are in contact with groove walls S31 of the key groove S3 shown in FIG. 1, and tip end portion (protrusion end portion) 314 thereof may not be in contact with the groove bottom S32. It should be noted that the key 312 and key groove S3 may be omitted or a plurality of keys 312 and a plurality of key grooves S3 may be provided.

As shown in FIG. 3, each of the second piece portions 32 is arranged adjacent to the first piece portion 31 of each of the broad portions 30a in the circumferential direction of the first surface 301 and second surface 302 of the flat-plate portion 30, and is made elastically deformable with a second bent portion 32x to bent toward the second surface 302 side of the flat-plate portion 30 used as a point of origin. In the example shown in FIG. 3, the second piece portion 32 includes a base end portion 32a and contact portion 32b, and is configured as a spring piece in which the contact portion 32b is elastically deformable relatively to the base end portion 32a. The second bent portion 32x is provided on the base end portion 32a.

In the map shape on the virtual plane shown in FIG. 4, each of the second piece portions 32 is positioned on the outside of the inscribed circle 131 in contact with the inner circumferential edge of the first piece portion 31 adjacent to the aforementioned second piece portion 32. Further, the second piece portion 32 is arranged in the vicinity of the first piece portion 31. In this embodiment, the base end portion 32a and first piece portion 31 are arranged in such a manner that a predetermined interval is held between them without being directly continuous with each other in the circumferential direction. In the fixing ring shown in FIG. 3, two second piece portions 32 are arranged in such a manner that one second piece portion 32 is arranged on either side of one first piece portion 31 in the circumferential direction with the one first piece portion 31 interposed between the two second piece portions 32. A spring piece configured to include the first piece portion 31 and second piece portions 32 on both sides of the first piece portion 31 all of which constitute one element-set is arranged on the flat-plate portion 30 in accordance with, for example, the arrangement of magnetic poles of the resolver. In the example shown in FIG. 3, four element-sets are arranged in accordance with the magnetic-pole arrangement of the resolver, in other words, one element-set is arranged for each pole of the resolver rotor 1.

In the map shape on the virtual plane shown in FIG. 4, the base end portion 32a extends from the inner circumference of the flat-plate portion 30 in parallel with the flat-plate portion 30 toward the outer circumferential surface S2 of the rotating shaft S shown in FIG. 1, i.e., in short, toward the shaft center C. The extension length of the base end portion 32a in the radial direction is less than the extension length of the first piece portion 31 in the radial direction by an amount corresponding to the situation in which the base end portion 32a extends from the inner circumference of the flat-plate portion 30 in parallel with the flat-plate portion 30 so as not to incline relatively to the flat-plate portion 30.

The contact portion 32b extends from the base end portion 32a in the circumferential direction and in the direction away from the first piece portion 31 adjacent to the second piece portion 32. Further, the contact portion 32b extends to incline toward the second surface 302 side relatively to the base end portion 32a, in short, relatively to the flat-plate portion 30 so as to get closer to the other end face 1c of the resolver rotor 1. In the example shown in FIG. 3, whereas the first piece portion 31 is inclined upwardly in the axial direction, the contact portion 32b is inclined downwardly in the axial direction. That is, the contact portion 32b is inclined oppositely to the first piece portion 31 in the axial direction. The width (length in the radial direction) of the contact portion 32b in the radial direction is less than the extension length of the base end portion 32a in the radial direction. The contact portion 32b extends so as to be apart from the inner circumference of the flat-plate portion 30 in the radial direction, and extends so as to be apart from the outer circumferential surface S2 of the rotating shaft S. The contact portion 32b extending in this manner is configured as a spring piece capable of elastic deformation relative to the base end portion 32a by making the second bent portion 32x which is the portion to be bent relatively to the base end portion 32a a point of origin.

When the fixing ring 3 is press-fitted onto the rotating shaft S, the contact portion 32b is brought into contact with the other end face 1c of the resolver rotor 1, whereby the contact portion 32b is pressed by the other end face 1c to thereby be elastically deformed relatively to the base end portion 32a in an upwardly warping manner. Then, in a state where the flat-plate portion 30 is in contact with the other end face 1c of the resolver rotor 1, the contact portion 32b presses the other end face 1c by the restoring force of the elastic deformation. Thereby, the contact portion 32b presses the resolver rotor 1 against the seating face portion S1 of the rotating shaft S. That is, in this state, the fixing ring 3 interposes the resolver rotor 1 between itself and the seating face portion S1 to thereby position and fix the resolver rotor 1 in the axial direction (state shown in FIG. 1).

At this time, in the first piece portion 31, the contact portion 31a presses the outer circumferential surface S2 of the rotating shaft S by the restoring force of the elastic deformation, and load (pressing force) in the axial direction created by the elastic deformation of the contact portion 32b is absorbed by the aforementioned restoring force, whereby the deformation of flat-plate portion 30 such as a twist or the like is suppressed. In the example shown in FIG. 3, the second piece portions 32 are arranged one on each side of one first piece portion 31 in the circumferential direction, the first piece portion 31 being interposed between the second piece portions 31, and hence it becomes possible to more effectively suppress deformation of the flat-plate portion 30. In this case, the contact portions 32b of the second piece portions 32 on both sides of the first piece portion 31 interposed between the second piece portions 32 each extend oppositely in the circumferential direction.

As described above, according to this embodiment, the fixing ring 3 includes the first piece portions 31 and second piece portions 32, whereby it is possible to position the fixing ring 3 in the axial direction and radial direction relatively to the rotating shaft S. At the same time, the fixing ring 3 is positioned in the manner described above, whereby it is possible to position and fix the resolver rotor 1 by interposing the resolver rotor 1 between the fixing ring 3 and seating face portion S1. At this time, it is possible to absorb the force of deforming the flat-plate portion 30 created when the contact portion 32b presses the resolver rotor 1 by the restoring force of the first piece portion 31, i.e., by the force of pressing the outer circumferential surface S2 of the rotating shaft S. That is, it is possible to suppress displacement of the resolver rotor 1 relative to the rotating shaft S while appropriately adjusting the pressing force exerted by the first piece portion 31 and second piece portion 32. Further, it is possible to suppress deformation of the flat-plate portion 30 to be caused by the aforementioned pressing force, and appropriately secure the area of contact between the flat-plate portion 30 and the other end face 1c of the resolver rotor 1, i.e., the friction area. As a result, it becomes possible to appropriately suppress the displacement of the resolver rotor 1 relative to the rotating shaft S, and improve the detection accuracy of the rotational angle obtained by the resolver.

In order to suppress the displacement of the resolver rotor 1 and appropriately position the resolver rotor 1 relatively to the rotating shaft S and appropriately fix the rotor 1 to the rotating shaft S, it is necessary to concentrically position the rotating shaft S and fixing ring 3. For example, in the state where the center of the fixing ring 3 is deviated from the shaft center C of the rotating shaft S, variations occur among the configurations at the time of elastic deformation of the four first piece portions 31. When such variations occur, the forces of the contact portions 31a of the first piece portions 31 pressing the outer circumferential surface S2 of the rotating shaft S also vary, and exertion of the pressing forces becomes non-uniform. Consequently, there is a possibility of the fixing ring 3 not being appropriately supported relatively to the rotating shaft S, and resolver rotor 1 not being appropriately positioned relatively to the rotating shaft S and not being appropriately fixed to the rotating shaft S.

Figure 5:
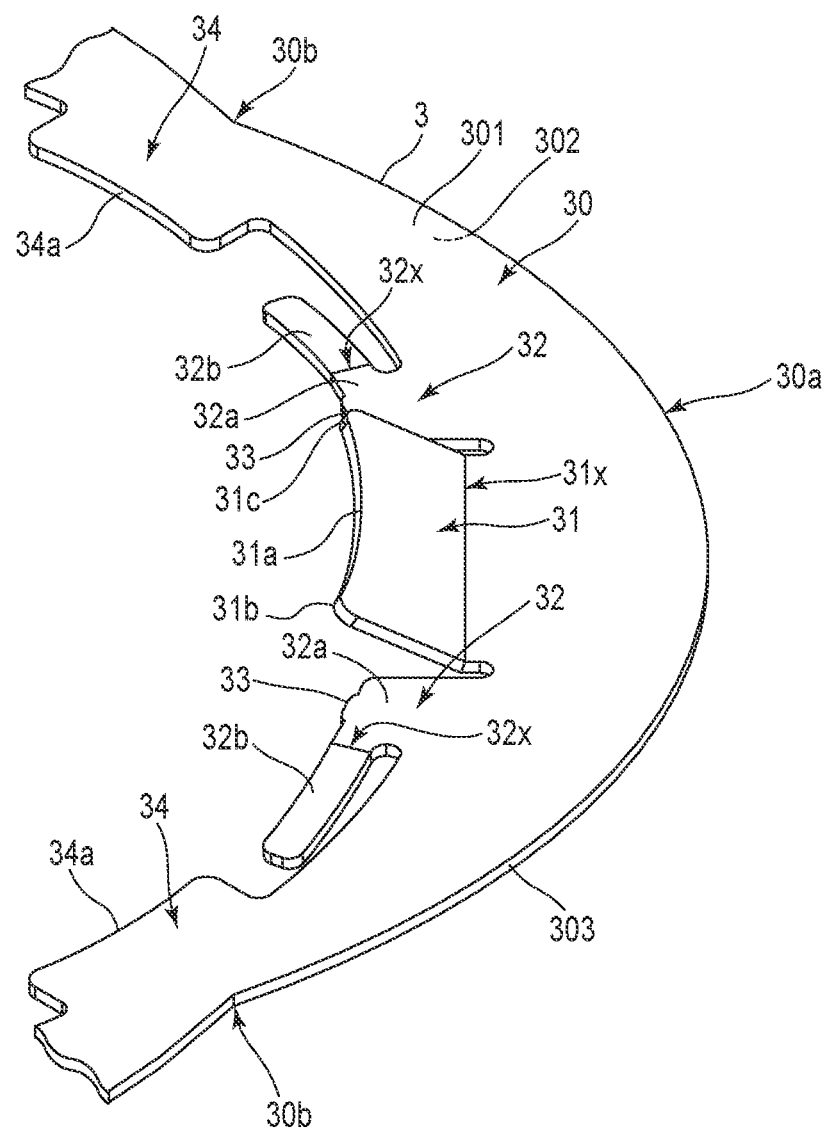
FIG. 5 is a perspective view schematically showing protrusions by partially enlarging the fixing ring shown in FIG. 3.

Accordingly, as shown in FIGS. 3 to 5, the fixing ring 3 includes protrusions 33 and 34 configured to position the center thereof concentric with the shaft center C of the rotating shaft S. FIG. 5 is a perspective view schematically showing the protrusions 33 and 34 by partially enlarging the fixing ring 3 shown in FIG. 3. Unlike the first piece portion 31 and second piece portion 32, each of the protrusions 33 and 34 does not function as a spring piece for the flat-plate portion 30. Accordingly, each of the protrusions 33 and 34 is not deformable relatively to the flat-plate portion 30 or maintains the configuration thereof as it is without being largely deformed elastically unlike the first piece portion 31 and second piece portion 32.

In the map shape on the virtual plane shown in FIG. 4, each of the second piece portions 32 includes a protrusion (first protrusion) 33 protruding in the radial direction of the inscribed circle 131 outside the inscribed circle 131 in contact with the inner circumferential edge of first piece portion 31 adjacent to the aforementioned second piece portion 32 in the circumferential direction. In other words, the radius r3 of the inscribed circle 133 in contact with the inner circumferential edge of the protrusion 33 is greater than the radius r2 of the inscribed circle 131. The center point of the inscribed circle 133 is the intersection point of the shaft center C and virtual plane.

In the example shown in FIG. 3 and FIG. 5, the protrusion 33 is provided at the base end portion 32a of the second piece portion 32, and is configured as a part of the base end portion 32a. The protrusion 33 extends from a part of the tip end portion (extension end portion) of the base end portion 32a in the radial direction toward the outer circumferential surface S2 of the rotating shaft S shown in FIG. 1, in short, toward the shaft center C in parallel with the base end portion 32a. The extension length of the protrusion 33 in the radial direction is made such a dimension that the protrusion 33 does not thereby come into contact with the outer circumferential surface S2 of the rotating shaft S. The tip end portion (extension end portion) of the protrusion 33 in the radial direction is made to have a configuration in which the outline form of the tip end portion in the map shape on the virtual plane shown in FIG. 4 is convexly curved. Accordingly, the protrusion 33 becomes capable of coming into approximate point contact with the outer circumferential surface S2 at most inwardly protruding (swelling) portions thereof at the time of press-fitting of the fixing ring 3 onto the rotating shaft S.

The base end portion 32a of the second piece portion 32 is arranged in the vicinity of the first piece portion 31. Accordingly, when the first piece portion 31 is elastically deformed at the time of press-fitting of the fixing ring 3 onto the rotating shaft S, the protrusion 33 of each of the second piece portions 32 comes into contact with the outer circumferential surface S2 in the vicinity of the first piece portion 31. At this time, each of the protrusions 33 hardly undergoes elastic deformation relative to the flat-plate portion 30 unlike the first piece portion 31 and second piece portion 32, and hence fulfills the function of positioning the center of the fixing ring 3 concentric with the shaft center C of the rotating shaft S. Thereby, it is possible to elastically deform, for example, the four first piece portions 31 almost uniformly at the time when the fixing ring 3 is press-fitted onto the rotating shaft S, and press the outer circumferential surface S2 of the rotating shaft S almost uniformly by means of the contact portion 31a of each of the first piece portions 31. Accordingly, it becomes possible to appropriately support the fixing ring 3 relatively to the rotating shaft S, and appropriately position the resolver rotor 1 relatively to the rotating shaft S and appropriately fix the resolver rotor 1 to the rotating shaft S. After the fixing ring 3 is press-fitted onto the rotating shaft S, the protrusion 33 is not in contact with the outer circumferential surface S2 and is placed in a non-contact state.

In the map shape on the virtual plane shown in FIG. 4, the protrusion 34 is arranged adjacent to the second piece portion 32 in the circumferential direction. In the example shown in FIG. 4, the protrusion 34 is positioned outside the inscribed circle 131 in contact with the inner circumferential edge of each of the first piece portions 31. Further, the protrusion 34 is positioned outside the inscribed circle 133 in contact with the inner circumferential edge of each of the protrusions 33. That is, the radius r4 of the inscribed circle 134 in contact with the inner circumferential edge of the protrusion 34 is greater than the radius r3 of the inscribed circle 133. The center point of the inscribed circle 134 is the intersection point of the shaft center C and virtual plane. As described above, the protrusion 34 is a protruding portion provided on the flat-plate portion 30 separately from the first piece portion 31 and second piece portion 32. The protrusion 34 extends from the inner circumference of the flat-plate portion 30 toward the outer circumferential surface S2 of the rotating shaft S shown in FIG. 1, in short, toward the shaft center C. The extension length of the protrusion 34 in the radial direction is made such a dimension that the protrusion 34 does not thereby come into contact with the outer circumferential surface S2 of the rotating shaft S.

The protrusion 34 includes an opposition portion 34a not in contact with the outer circumferential surface S2 and opposed thereto. The opposition portion 34a is a tip end portion (extension end portion) of the protrusion 34. The opposition portion 34a is made to have a configuration concavely curved by a curvature greater than the curvature of, for example, the outer circumferential surface S2.

The protrusion 34 is arranged in the portion of the flat-plate portion 30 including the narrow portion 30b in such a manner that the protrusion 34 overlaps the portion at which the width (difference between the outer diametric dimension and inner diametric dimension) of the flat-plate portion 30 in the radial direction is minimized, i.e., the narrow portion 30b when viewed in the radial direction on the virtual plane. The portion of the flat-plate portion 30 overlapping the protrusion 34 as described above corresponds to a portion at which the cross-sectional area of the flat-plate portion 30 in the predetermined plane defined by the radial direction and axial direction is minimized. Accordingly, by arranging the protrusion 34 at the aforementioned portion, the aforementioned cross-sectional area is increased correspondingly, and hence it is possible to enhance the strength of the flat-plate portion 30, in short, the fixing ring 3. In the example shown in FIG. 3, four protrusions 34 are provided and are arranged so as to be point-symmetric relatively to the shaft center C. In this case, the protrusions 34 are each arranged between the aforementioned four element-sets each of which is constituted of a first piece portion 31 and two second piece portions 32 on both sides of the first piece portion 31 interposed between the two second piece portions 32. However, the number of the protrusions 34 is not limited. Further, when the fixing ring 3 can maintain the appropriate strength, the protrusions 34 can be omitted.

Figure 6:
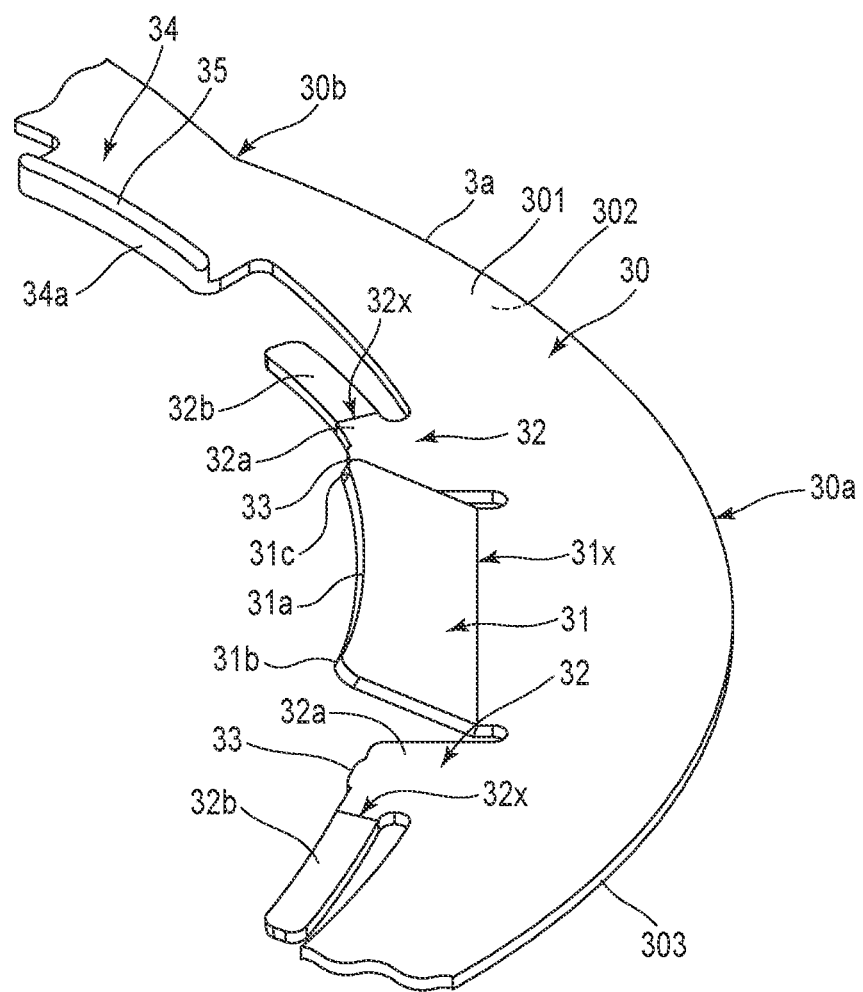
FIG. 6 is a perspective view schematically showing an example of a modified example in which a rib is provided on a protrusion in the fixing ring of the embodiment.

It should be noted that in order to further enhance the strength of the fixing ring 3, the protrusion 34 may be provided with a reinforcing portion. In FIG. 6, an example of a fixing ring 3a according to a modified example in which a reinforcing portion 35 is provided on the protrusion 34 is schematically shown. It should be noted that configurations in the fixing ring 3a other than the reinforcing portion 35 are identical to the fixing ring 3, and hence these configurations are denoted by reference symbols identical to the fixing ring 3 in the drawings and descriptions of these configurations are omitted. In the example shown in FIG. 6, the reinforcing portion 35 is positioned on the opposition portion 34a which is the tip end portion of the protrusion 34, and rises from the opposition portion 34a in the direction of the distance between the first surface 301 of the flat-plate portion 30 and second surface 302 thereof, i.e., in the axial direction. Thereby, the reinforcing portion 35 functions as a rib configured to enhance the strength of the fixing ring 3, in particular, the vicinity of the narrow portion 30b of the flat-plate portion 30. The rising direction of the reinforcing portion 35 is the direction (in this embodiment, upward direction) away from the other end face 1c of the resolver rotor 1.

In the above-described embodiment, the resolver rotor 1 and fixing ring 3 are configured as separate bodies. Instead of the above, for example, the fixing ring may be configured as one of the resolver rotor constituent members of the resolver rotor.

Figure 7:
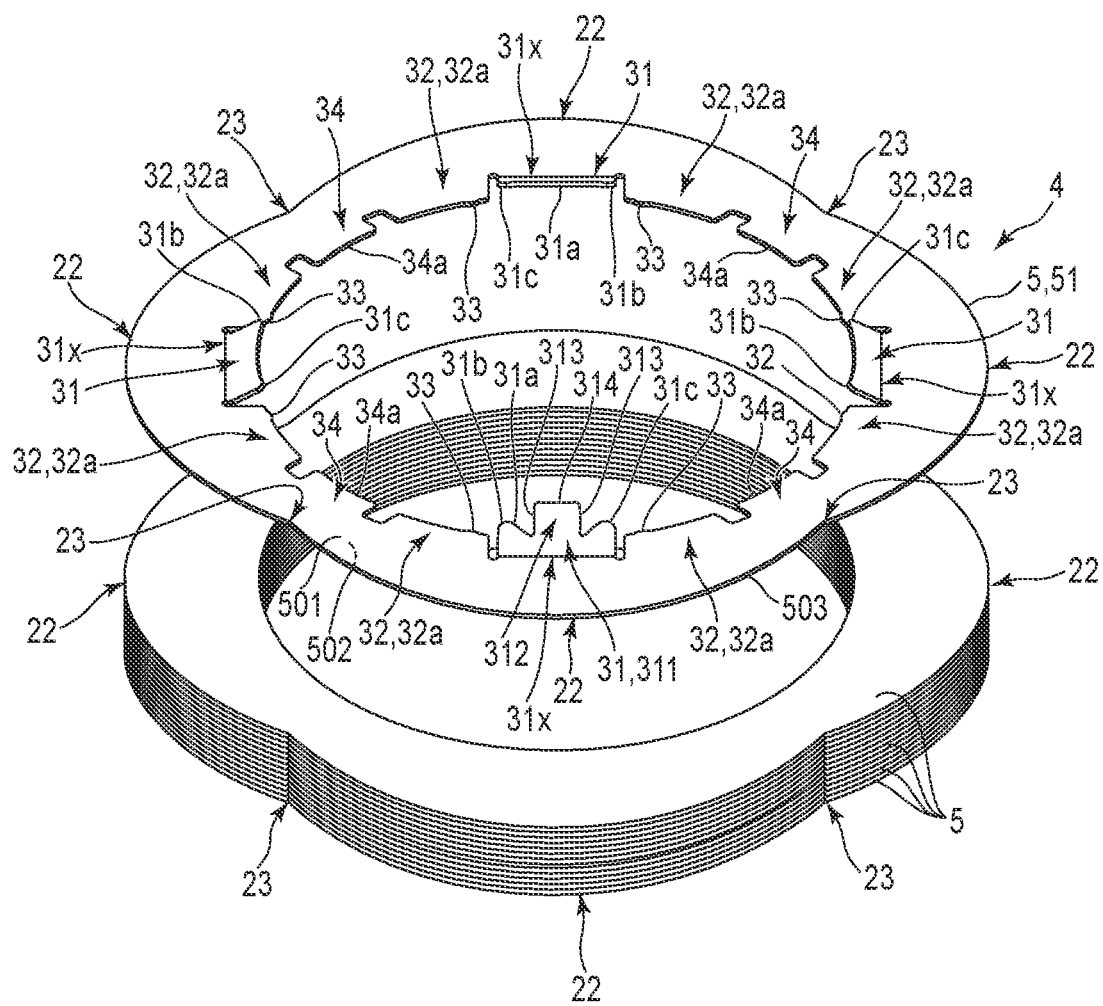
FIG. 7 is a perspective view showing an example of an embodiment in which a fixing ring is made one of resolver rotor constituent members of a resolver rotor.

In FIG. 7, an example of an embodiment configured by making a fixing ring one of resolver rotor constituent members of a resolver rotor is shown. In the example shown in FIG. 7, a resolver rotor 4 is constituted by stacking a plurality of resolver rotor constituent members 5 on top of each other in layers as in the case of the resolver rotor 1. However, a resolver rotor constituent member 51 positioned on the predetermined side in the axial direction is made to have a configuration formed by modifying the configuration of the fixing ring 3 in the form of the second piece portion 32 thereof. The predetermined side in the axial direction is the other end side in the axial direction in the above-described embodiment, and is the opposite side of the side on which the resolver rotor 4 is in contact with the seating face portion S1. In this case, the resolver rotor constituent member 51 has a configuration in which the contact portion 32*b* is omitted from the second piece portion 32 of the fixing ring 3. That is, the resolver rotor constituent member 51 exhibits the function effect equivalent to the function effect of the fixing ring 3 exhibited by the members other than the contact portions 32*b*. It should be noted that constituent elements equivalent to those of the aforementioned fixing ring 3 (FIG. 3) are denoted by reference symbols identical to those of the fixing ring 3 in the drawings.

As shown in FIG. 7, the resolver rotor 4 is configured by stacking a plurality of iron cores (hereinafter referred to as iron cores 5) which are the resolver rotor constituent members 5 on top of each other in layers. Each of the iron cores 5 includes broad portions 22 and narrow portions 23. The narrow portion 23 is a portion provided on each of a first surface 501 and second surface 502 of the iron core 5 opposed to each other in parallel with each other, and is a portion a width of which is the narrowest when viewed from the outer circumferential surface 503 of the iron core 5 in the inward normal direction of the outer circumferential surface 503. The normal direction corresponds to the radial direction. The outer circumferential surface 503 of the iron core 5 is a surface portion connecting between the outer circumferential edge of the first surface 501 and outer circumferential edge of the second surface 502. The broad portion 22 is a portion provided on each of the first surface 501 and second surface 502 of the iron core 5, and is a portion having a width greater than the narrow portion 23.

The iron core 5 (resolver rotor constituent member 51) positioned at one end in the stacking direction includes a plurality of first piece portions 31. The first piece portion 31 is a portion equivalent to the first piece portion 31 in the fixing ring 3. The first piece portions 31 are provided one on each of the broad portions 22, and are each made elastically deformable with a first bent portion 31*x* to be bent toward the first surface 501 side of the iron core 5 serving as a point of origin. Thereby, each of the first piece portions 31 is elastically deformed in the normal direction (inward normal direction) from the outer circumferential surface 503 of the broad portion 22 to the inside of the outer circumferential surface 503, in short, inwardly in the radial direction with the first bent portion 31*x* serving as the point of origin. That is, the first piece portion 31 functions as a spring piece.

In a map shape conforming to the map shape on the virtual plane shown in FIG. 4 and equivalent thereto, the first bent portion 31*x* of each of the first piece portions 31 intersects a straight line (equivalent to the straight line L31) passing through a contact point (equivalent to the contact point P31 of the circumscribed circle O31) of a circumscribed circle in contact with the outer circumferential edge of the broad portion 22 on which the first piece portion 31 is provided and center point of the aforementioned circumscribed circle. The aforementioned map shape is a shape of a map formed by projecting the plurality of broad portions 22, plurality of first piece portions 31, and plurality of second piece portions 32 onto a virtual plane parallel to the first surface 501 of the iron core 5. Further, in the aforementioned map shape, each of the first piece portions 31 is positioned between the inscribed circle (equivalent to the inscribed circle 131) in contact with the inner circumferential edge of the first piece portion 31 and first bent portion 31*x*. The center point of the aforementioned inscribed circle is a point of intersection of the shaft center C and virtual plane.

As shown in FIG. 7, the resolver rotor constituent member 51 which is the iron core includes portions corresponding to the portions in the fixing ring 3 other than the contact portions 32*b*, more specifically, portions corresponding to the first piece portions 31, base end portions 32*a* of the second piece portions 32, key 312, and protrusions 33 and 34, and the like. Further, each of the resolver rotor constituent members 5 and 51 has a planar shape in which the broad portions 22 and narrow portions 23 are alternately continuous with each other and outer circumferential shapes of the broad portions 22 and narrow portions 23 are alternately continuous with each other at the outer circumferential edge. In the resolver rotor 4, the resolver rotor constituent member 51 and resolver rotor constituent members 5 other than the resolver rotor constituent member 51 are coupled to each other in the axial direction by, for example, calking or the like to thereby be integrated with each other.

Even when the resolver rotor 4 is configured to include the resolver rotor constituent member 51 as described above, it is possible to appropriately adjust the force of suppressing displacement of the resolver rotor 4 relative to the rotating shaft S, appropriately position the resolver rotor 4 relatively to the rotating shaft S, and appropriately fix the resolver rotor 4 to the rotating shaft S.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing ring comprising:
    a plurality of narrow portions which are provided on an annular first surface and a second surface opposed to each other in parallel with each other, and widths of which viewed from an outer circumferential surface connecting between an outer circumferential edge of the first surface and an outer circumferential edge of the second surface in an inward normal direction of the outer circumferential surface are the smallest;
    a plurality of broad portions which are provided on the first surface and the second surface, and widths of which are greater than the widths of the narrow portions;
    a plurality of first piece portions each of which is provided on each of the broad portions, and is elastically deformable in the normal direction of the broad portion with a first bent portion to be bent toward the first surface side serving as a point of origin, and
    a plurality of second piece portions each of which is arranged adjacent to the first piece portion of each of the broad portions in a circumferential direction of the first surface and the second surface and is elastically deformable in a direction of a distance between the first surface and the second surface with a second bent portion to be bent toward the second surface side serving as a point of origin, wherein
    in a map shape formed by projecting the plurality of broad portions and the plurality of first piece portions onto a virtual plane parallel to the first surface, the first bent portion of each of the first piece portions intersects a straight line passing through a contact point of a circumscribed circle in contact with an outer circumferential edge of the broad portion on which the first piece portion is provided and a center point of the circumscribed circle, and each of the first piece portions is positioned between an inscribed circle in contact with an inner circumferential edge of the first piece portion and the first bent portion, and in a map shape formed by projecting the plurality of first piece portions and the plurality of second piece portions onto the virtual plane, each of the second piece portions is positioned outside the inscribed circle in contact with the inner circumferential edge of the first piece portion adjacent to the second piece portion.

2. The fixing ring of claim 1, wherein in the map shape formed by projecting the plurality of first piece portions and the plurality of second piece portions onto the virtual plane, each of the second piece portions includes a first protrusion protruding outside the inscribed circle in contact with the inner circumferential edge of the first piece portion adjacent to the second piece portion in a circumferential direction of the first surface and the second surface in a radial direction of the inscribed circle.

3. The fixing ring of claim 2, wherein in the map shape formed by projecting the plurality of first piece portions onto the virtual plane, one of the plurality of first piece portions includes a second protrusion inwardly protruding from the inscribed circle in contact with the inner circumferential edges of the first piece portions other the one first piece portion in the radial direction of the inscribed circle.

4. The fixing ring of claim 1, further comprising ribs each of which is arranged, in the map shape formed by projecting the plurality of first piece portions and the plurality of second piece portions onto the virtual plane, adjacent to the second piece portions in the circumferential direction of the first surface and the second surface and rises in the direction of the distance between the first surface and the second surface outside the inscribed circle in contact with the inner circumferential edge of the first piece portion.

5. The fixing ring of claim 4, wherein in the map shape formed by projecting the plurality of first piece portions onto the virtual plane, one of the plurality of first piece portions includes a second protrusion inwardly protruding from the inscribed circle in contact with the inner circumferential edges of the first piece portions other the one first piece portion in the radial direction of the inscribed circle.

6. The fixing ring of claim 1, wherein in the map shape formed by projecting the plurality of first piece portions onto the virtual plane, one of the plurality of first piece portions includes a second protrusion inwardly protruding from the inscribed circle in contact with the inner circumferential edges of the first piece portions other the one first piece portion in the radial direction of the inscribed circle.

7. A rotary electric machine comprising:
a shaft rotating around a central axis;
a rotor fixed to the shaft so as to be concentric with the shaft;
a stator arranged in opposition to the rotor; and
a resolver rotor including a predetermined number of poles and fixed to the shaft so as to be concentric with the rotor by means of the fixing ring of claim 1, wherein
the first piece portion and the second piece portions adjacent to the first piece portion in the circumferential direction are arrange for each of the poles of the resolver rotor.

8. A resolver rotor, wherein
a plurality of iron cores each including a plurality of narrow portions which are provided on an annular first surface and a second surface opposed to each other in parallel with each other, and widths of which viewed from an outer circumferential surface connecting between an outer circumferential edge of the first surface and an outer circumferential edge of the second surface in an inward normal direction of the outer circumferential surface are the smallest, and a plurality of broad portions widths of which are greater than the widths of the narrow portions are stacked on top of each other in layers,
the iron core positioned at one end in the stacking direction includes a plurality of first piece portions each of which is provided on each of the broad portions and is made elastically deformable in the normal direction of the broad portion with a first bent portion to be bent toward the first surface side serving as a point of origin and a plurality of second piece portions each of which is arranged adjacent to the first piece portion of each of the broad portions in a circumferential direction of the first surface and the second surface and is elastically deformable in a direction of a distance between the first surface and the second surface with a second bent portion to be bent toward the second surface side serving as a point of origin, and
in a map shape formed by projecting the plurality of broad portions and the plurality of first piece portions onto a virtual plane parallel to the first surface, the first bent portion of each of the first piece portions intersects a straight line passing through a contact point of a circumscribed circle in contact with an outer circumferential edge of the broad portion on which the first piece portion is provided and a center point of the circumscribed circle, and each of the first piece portion is positioned between an inscribed circle in contact with an inner circumferential edge of the first piece portion and the first bent portion,
in a map shape formed by projecting the plurality of first piece portions and the plurality of second piece portions onto the virtual plane, each of the second piece portions is positioned outside the inscribed circle in contact with the inner circumferential edge of the first piece portion adjacent to the second piece portion.

* * * * *